March 31, 1964 S. C. POLLOCK ETAL 3,127,116
VEHICLE HEADLIGHT WASHER SYSTEM
Filed Sept. 28, 1961 2 Sheets-Sheet 1

INVENTORS
Samual C. Pollock
John W. Yee
BY
*W. E. Finchen*
Their Attorney

March 31, 1964   S. C. POLLOCK ETAL   3,127,116
VEHICLE HEADLIGHT WASHER SYSTEM
Filed Sept. 28, 1961   2 Sheets-Sheet 2
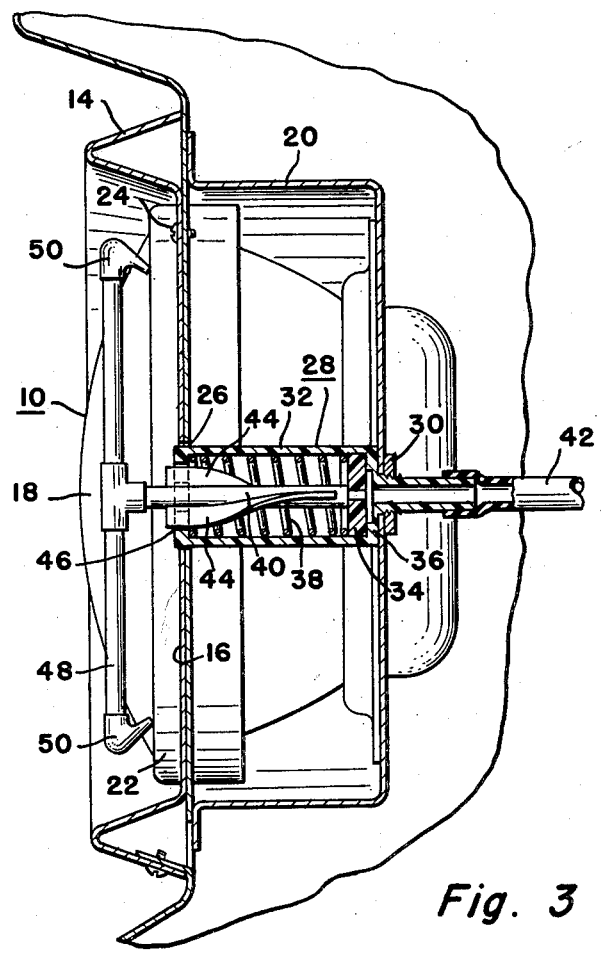
Fig. 3
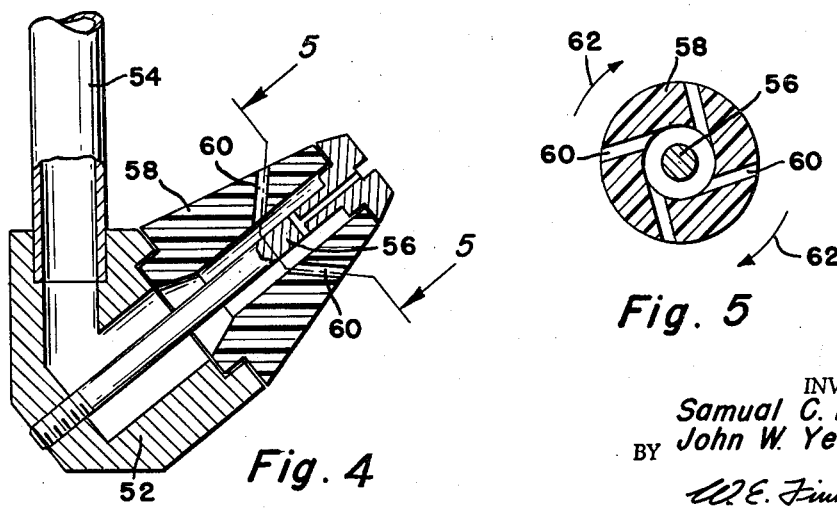
Fig. 4
Fig. 5
INVENTORS
Samual C. Pollock
BY John W. Yee
W.E. Finken
Their Attorney

United States Patent Office 3,127,116
Patented Mar. 31, 1964

3,127,116
VEHICLE HEADLIGHT WASHER SYSTEM
Samuel C. Pollock, Rochester, and John W. Yee, Roseville, Mich., assignors to General Motors Corporation, Detroit, Mich., a corporation of Delaware
Filed Sept. 28, 1961, Ser. No. 141,493
6 Claims. (Cl. 240—7.1)

This invention pertains to motor vehicles, and particularly to pressure operated washer systems for the lenses of vehicle headlights.

In our copending application Serial No. 127,611 filed July 28, 1961, several embodiments of pressure operated washer systems for the lenses of vehicle headlights are disclosed. As pointed out therein, the accumulation of dirt and road grime on the lenses of vehicle headlights constitutes a serious night driving hazard, and a headlight washer system constitutes a safety device which is capable of removing the illumination obscuring material which collects on vehicle headlight lenses. The present invention relates to an improved pressure operated headlight washer system wherein the washer nozzle is automatically projected during operation to a position both forward and directly in front of the headlight lens, particularly in a dual headlight installation, so as to more effectively clean the headlight lens.

Accordingly, among our objects are the provision of a pressure operated washer system for the lenses of vehicle headlights including extensible and retractable nozzle means which, under operating conditions, are extended to a position both forward and directly in front of the headlight lens; the further provision of a headlight washer system of the aforesaid type including a rotary nozzle means for effectively distributing the cleaning fluid over the entire surface of the headlight lens; and the still further provision of a washer system for a dual headlight installation including means for imparting conjoint linear and angular movement to the nozzle means as it is extended to its operative position so that the nozzle means will be both forward and directly in front of both headlight lenses.

The aforementioned and other objects are accomplished in the present invention by attaching the nozzle means to a reciprocable piston which is movable under hydrostatic pressure, and directing liquid solvent through tangential orifices in a rotatably mounted spray head. Specifically, the nozzle means are carried by the outer end of a hollow piston rod which is attached to a piston disposed within a cylinder. The piston is normally spring biased to a retracted position wherein the nozzle means are substantially concealed from view by an ornamental headlight bezel.

More particularly, the hollow piston rod is formed with one or more spiral, or helical, ribs, or vanes, which coact with one or more grooves in the rod end of the cylinder so that linear movement of the piston rod is accompanied by angular movement. The piston rod forms the stem of a T, the bar of which carries a pair of spray nozzles, the bar assuming a position between the dual headlights when retracted and being disposed both forwardly and with the spray nozzles directly in front of the headlight lens when extended. It is to be understood that where the dual headlights are aligned horizontally the bar of the T will be substantially vertical when retracted and substantially horizontal when extended, whereas when the dual headlights are vertically aligned the bar of the T will be substantially horizontal when retracted and substantially vertical when extended. In any event, irrespective of the orientation of the two headlights of the dual headlight installation, the nozzle carrying means will be angularly moved throughout substantially 90° from its fully retracted position to its fully extended position.

Further objects and advantages of the present invention will be apparent from the following description, reference being had to the accompanying drawings, wherein preferred embodiments of the present invention are clearly shown and wherein similar reference numerals depict similar parts throughout the several views.

In the drawing:

FIGURE 3 is an enlarged, fragmentary view, partly in section and partly in elevation, taken along line 3—3 of FIGURE 1.

FIGURE 4 is a view in elevation of a modified spray nozzle.

FIGURE 5 is an enlarged sectional view taken along line 5—5 of FIGURE 4.

Figure 1:
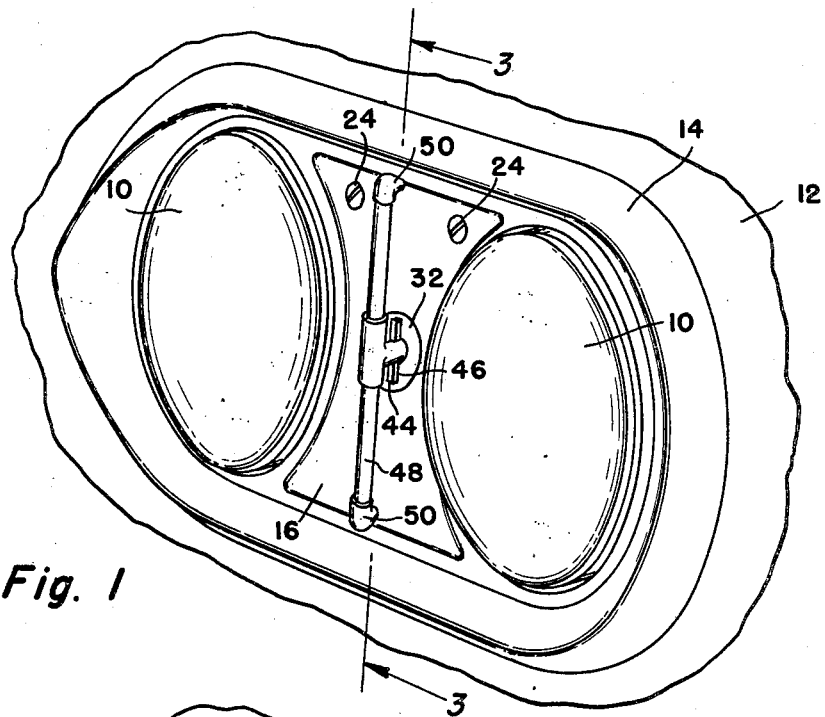
FIGURE 1 is a fragmentary view in elevation, of a dual headlight washer installation constructed according to the present invention with the nozzle means retracted.

With particular reference to FIGURE 1, a typical dual headlight installation for one side of a motor vehicle is shown comprising a pair of horizontally aligned headlights 10 mounted in a vehicle fender 12 and surrounded by a common ornamental bezel 14 having a decorative inner portion 16 with openings through which the headlights 10 project. With reference to FIGURE 3, each headlight 10 has a partially spherical lens 18, which is suitably attached to a reflector housing and a mounting flange, or rim, not shown. Each headlight is supported within a conventional mounting ring assembly 20 by means of an annular retainer 22 which is detachably connected to the mounting rim assembly by a plurality of screws 24.

As seen in FIGURE 3, the decorative inner portion 16 of the ornamental bezel 14 disposed between the two headlights 10 has an opening 26 therein in substantial alignment with the centers of the headlights, and through which part a washer nozzle assembly projects. The nozzle assembly 28 is attached to the mounting ring assembly 20 by a nut 30. The washer nozzle assembly includes a stationary cylinder 32 having a centrally apertured reciprocable piston 34 disposed therein and normally held in engagement with a shoulder 36 by a compression spring 38. The compression spring 38 encircles an integral hollow piston rod 40 which projects from the rod end of the cylinder 32. It is to be understood that both the cylinder and the piston are circular in cross-section, and the piston and piston rod are preferably composed of self-lubricating plastic material such as nylon.

A supply conduit 42 is suitably attached to a fitting on the inner end of the nozzle assembly 28, and liquid solvent under pressure is supplied by a pump from the reservoir or from an aerosol-type container, not shown. The liquid solvent is delivered under pressure for a predetermined time interval as controlled by a timer of any well-known type, not shown. It is pointed out that the diameter of the passage through the integral piston and piston rod is appreciably smaller than the diameter of the supply conduit 42 so that a build-up of hydrostatic pressure will occur within the cylinder 32 causing an outward movement of the piston 34.

Figure 2:
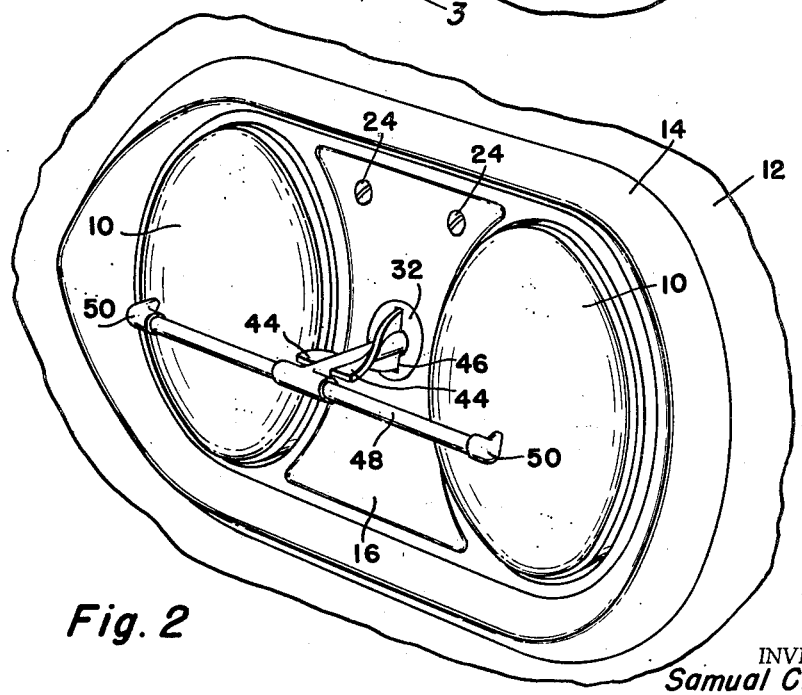
FIGURE 2 is a view similar to FIGURE 1 with the nozzle means extending to the operating position.

As seen particularly in FIGURES 2 and 3, the piston rod is formed with a plurality of helical vanes 44 which engage a like number of slots 46 in the rod end of the cylinder 32. Accordingly, any linear movement of the piston 34 will be accompanied by angular movement of the piston and the rod 40 due to coaction between the slots 46 and the helical vanes 44. The integral piston rod 40 forms a stem of a T, the bar of which is formed by a tube 48 attached to the outer end of the piston rod 40. A spray head 50 is attached to each end of the tube 48, the tube being of a length substantially equal to the diameter of the headlight lenses.

As seen in FIGURES 1 and 3, when the nozzle means is retracted by the spring 38, the tube 48 is disposed between the two headlights and in engagement with the decorative portion 16 of the headlight bezel 14. Upon the application of hydrostatic pressure to the cylinder 34, the nozzle means will be extended, and since linear movement is accompanied by angular movement the bar 48 will be moved angularly throughout substantially 90° to a substantially horizontal position shown in FIGURE 2. When the nozzle means is in the extended position, the spray heads 50 are both forward and directly in front of their respective headlight lenses. Moreover, they are substantially aligned with the centers of their respective headlights so that the liquid solvent discharged through the spray heads 50 will effectively remove the accumulated illumination obscuring material from the headlight lenses. When the supply of liquid solvent under pressure is interrupted, the spring 38 will retract the nozzle means, and in so doing rotate, or angularly displace the tube 48 to the vertical position of FIGURE 1 wherein the nozzle means do not in any way obstruct the illuminating beams of the headlights.

With reference to FIGURES 4 and 5, a modified spray head is disclosed including a hollow body portion 52 having an inlet fitting 54 and an outlet fitting 56. It is to be understood that the inlet fitting 54 can be connected to the tube 48 of the embodiment shown in FIGURES 1 through 3. A spray head 58 is rotatably supported on the outlet fitting 56, the spray head having a plurality of tangential orifices 60 such that the discharge of liquid solvent therethrough under pressure produces reaction forces which will rotate the spray head 58 in the direction of arrow 62 relative to the outlet fitting 56 and the body 52. The rotating spray head 58 is designed to more effectively distribute the liquid solvent over the entire surface of its respective headlight lens to remove the vision obscuring material therefrom.

While the embodiments of the invention as herein disclosed constitute preferred forms, it is to be understood that other forms might be adopted.

What is claimed is as follows:

1. In a vehicle, a headlight mounted in said vehicle and having a lens, movable nozzle means for spraying liquid solvent under pressure onto the outer surface of said headlight lens for cleaning the same, and means for imparting conjoint linear and angular movement to said nozzle means from a retracted position to an extended position both forward and directly in front of said headlight lens.

2. In a vehicle, a headlight mounted in said vehicle having a lens, lineally and angularly movable nozzle means extensible under hydrostatic pressure to a position both forward and directly in front of said headlight lens, and a rotatable spray head carried by said nozzle means for directing liquid solvent over the entire outer surface of said headlight lens.

3. In a vehicle, a dual headlight installation mounted in said vehicle comprising a pair of spaced headlights having lenses, movable nozzle means having a pair of spray heads for conjointly spraying liquid solvent under pressure onto the outer surface of both headlight lenses, and means for imparting conjoint linear and angular movement to said nozzle means from a retracted position between said headlights to an extended position wherein said spray heads are located both forward and directly in front of their respective headlight lenses.

4. In a vehicle, a headlight mounted in said vehicle, a bezel surrounding said headlight, a nozzle assembly mounted in said vehicle including a spray head disposed externally of said bezel, said nozzle assembly including a cylinder having a reciprocable piston therein operatively connected to said spray head, said piston having a rod extending outside of said cylinder, coacting helical means between said rod and said cylinder whereby upon movement of said piston to an extended position under the urge of hydrostatic pressure in said cylinder, said rod will have imparted thereto conjoint linear and angular movement so as to position said spray head both forward and directly in front of said headlight lens, and means operable to retract said piston when the hydrostatic pressure in said cylinder is relieved.

5. The combination set forth in claim 4 wherein said helical means comprises at least one helical rib on said piston rod, and a rib engaging slot in said cylinder.

6. In a vehicle, a dual headlight installation in said vehicle comprising a pair of spaced headlights having lenses, a bezel surrounding said headlights and a nozzle assembly supported in said vehicle, said nozzle assembly including a cylinder having a reciprocable piston therein movable under the urge of hydrostatic pressure in said cylinder, T-shaped nozzle means attached to said piston including a stem comprising a hollow piston rod and a tubular bar carrying a pair of spray heads, helical means coacting between said piston rod and said cylinder such that linear movement of said piston rod is accompanied by angular movement, the tubular bar of said nozzle means being disposed between said headlight lens when said piston is retracted and oriented so that said spray heads are both forward and directly in front of their respective headlight lenses when said piston is extended, and means operable to retract said piston when the hydrostatic pressure is relieved.

References Cited in the file of this patent
UNITED STATES PATENTS

| | | |
|---|---|---|
| 1,665,371 | Keys | Apr. 10, 1928 |
| 2,126,624 | Eaddy | Aug. 9, 1938 |
| 2,288,429 | Baughn | June 30, 1942 |
| 3,017,120 | Friant et al. | Jan. 16, 1962 |